United States Patent

Riebs

[15] 3,673,495

[45] June 27, 1972

[54] APPARATUS AND METHOD FOR MEASURING ELECTRICAL ENERGY CONSUMPTION

[72] Inventor: Richard E. Riebs, Hales Corners, Wis.

[73] Assignee: McGraw-Edison Company, South Milwaukee, Wis.

[22] Filed: Feb. 24, 1971

[21] Appl. No.: 118,355

[52] U.S. Cl. ............................................. 324/142
[51] Int. Cl. .......................................... G01r 21/00
[58] Field of Search ................................... 324/142

[56] References Cited

UNITED STATES PATENTS 3,500,200   3/1970   Woodhead ........................... 324/142

FOREIGN PATENTS OR APPLICATIONS 441,785   7/1965   Japan ................................. 324/142

*Primary Examiner*—Alfred E. Smith
*Attorney*—R. J. Falkowski

[57] ABSTRACT

A current transformer is connected to an electrical power circuit to provide a measure of the current in the power circuit. The current measure is applied through a reversing switch and a diode rectifying bridge to a coulombmeter and is controlled by commutating the bridge with a voltage from a voltage transformer connected to the electrical power circuit. The connections are made to apply current to the coulombmeter during the portion of the current cycle that occurs during a selected voltage half cycle. The current measure is further controlled by a modulating circuit connected to respond to the voltage of the power circuit and to pulse modulate the current as a function of voltage level. A control means responds to a selected condition of the coulombmeter to reverse the control current connections to the coulombmeter. A reading means senses the number of reversal operations to thereby provide an indication of the total amount of energy consumed in the power circuit over a selected period.

20 Claims, 6 Drawing Figures

*INVENTOR.*
RICHARD E. RIEBS
BY
*R J Falkowski*
ATTORNEY

*INVENTOR.*
RICHARD E. RIEBS
BY
R J Falkowski
ATTORNEY

APPARATUS AND METHOD FOR MEASURING ELECTRICAL ENERGY CONSUMPTION

This invention relates to electrical power measuring systems, particularly to static watt-hour meter systems for measuring energy consumption in an alternating electrical power circuit.

The measurement of electrical energy consumed in alternating current power circuits presently is usually accomplished with standard induction type watt-hour meters. Static watt-hour meters using relatively recently developed semiconductor electronic components, such as transistors and diodes, are generally recognized as having many better characteristics than induction meters. However, static watt-hour meters produced have been relatively expensive, relatively unreliable, and difficult to calibrate. A static watt-hour meter as shown in highly reliable, relatively inexpensive, and readily adaptable to reading by modern computer-type accounting systems. However, the compensation for the voltage variations must be provided to achieve the desirable accuracy. With this invention an accurate, simple and reliable modulating means compensates for voltage variations.

According to this invention a current proportional to the current in an alternating electrical power circuit is rectified and applied to a current measuring and integrating device and continuously modified as a function of the phase relationship between the voltage and current, thereby automatically compensating for the phase angle between voltage and current. To compensate for differences in voltage levels the current to the measuring device is pulse modulated as a function of the voltage level so that an accurate indication accounting for current, phase angle, and voltage is provided. A coulombmeter is used that accurately indicates total charge received which is proportional to energy consumed in the power circuit. The charge received is sensed and the current reversed when the coulombmeter has reached its storage capacity in one direction to charge the coulombmeter in an opposite direction. The total reversals are recorded to provide an indication of total power consumed by the power circuit over a selected period of time.

Other objects and advantages of this invention will be apparent from the following detailed description.

Figure 1:
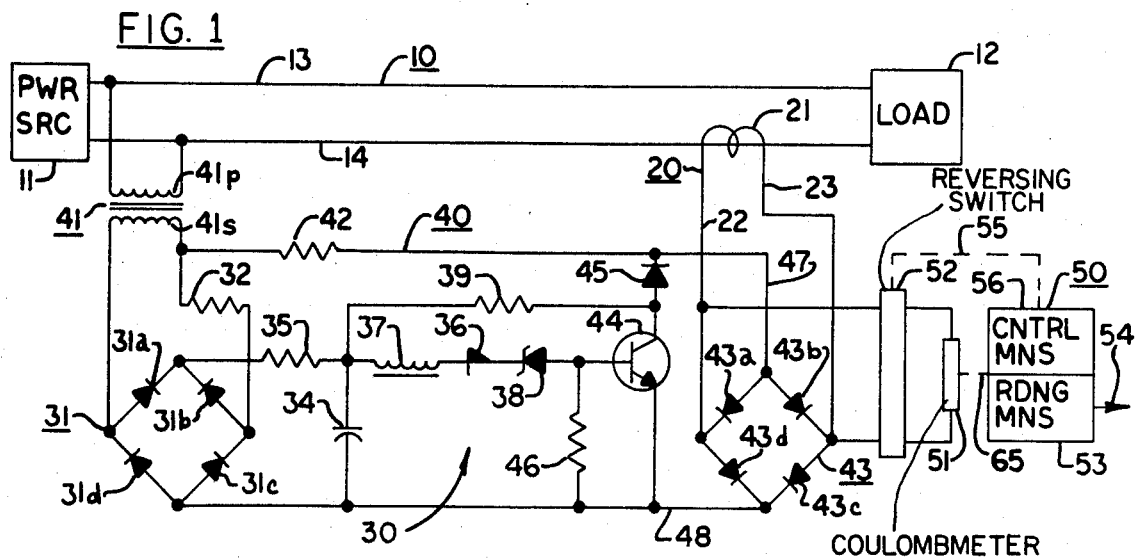
FIG. 1 is a schematic and block diagram of a watt-hour meter system according to this invention.

Referring to FIG. 1, an electrical power circuit 10 comprises an electrical power source 11 and a load 12 connected to the power source by conductors 13 and 14. An alternating electrical energy measuring system for measuring the electrical energy consumed by load 12 comprises a current means 20 responsive to the current in power circuit 10 for producing a control current varying as a function of the power circuit current, a phase angle means 40 responsive to the voltage in electrical circuit 10 for modifying the control current as a function of the phase angle between the voltage and current of power circuit 10, and a voltage means 30 responsive to the voltage in power circuit 10 for modifying the control current as a function of the power circuit voltage. The output from the power sensing means is applied to a recording means 50 for reading and indicating the total energy consumed by power circuit 10.

Referring to FIG. 1, current means 20 comprises a current transformer 21 connected to sense the current in conductor 14 and load 12. The characteristics of current transformer 21 are selected to provide a control current at a level desirable for the circuit components at the anticipated currents of the power circuit. The current means is responsive to the current in the electrical power circuit to produce a control current varying as a function of the power circuit current and at a selected phase angle to the power circuit current. In typical applications the control current is proportional to and substantially in phase with the power circuit current. The control current is delivered to recording means 50 along conductors 22 and 23.

The control current is modified by phase angle means 40 to compensate for any difference in phase angle between the voltage and current in power circuit 10. The phase angle means comprises a voltage transformer 41 having a primary winding 41p connected between conductors 13 and 14 and a secondary output winding 41s. Voltage transformer 41 is selected to produce a control voltage at a level varying as a function of the power circuit voltage and at a preselected phase angle relative to the voltage in circuit 10. In typical applications the control voltage is substantially proportional to and substantially in phase with the electrical circuit voltage and at a level selected to provide reliable operation of the system. The phase angle means also comprises a resistor 42 and a rectifying bridge 43 comprising diodes 43a, 43b, 43c and 43d connected to voltage transformer with conductors 47 and 48.

Voltage means 30 is connected to the power circuit to obtain a level control voltage varying as a function of the voltage level in the power circuit from voltage transformer 41. The voltage means modifies or modulates the control current as a function of the power circuit voltage in response to the level control voltage which appears at secondary winding 41s. The voltage means comprises a voltage sensing means for producing the level control voltage varying as a function of the load voltage level, a current control means for controlling the application of the control current to the recording means in response to an electrical signal input having a preselected level, a biasing means for biasing the current control means to stop the application of control current to the recording means, and a pulse modulating means responsive to the level of the control voltage for controlling the biasing means to pulse modulate the biasing means to apply control current pulses to the recording means at a rate substantially proportional to the level of the control voltage.

The voltage sensing means comprises voltage transformer 41 which produces the control voltage across output winding 41s. The control voltage is rectified by a rectifying bridge 31 comprising diodes 31a, 31b, 31c and 31d and received from output winding 41s through a resistor 32. The rectified control voltage is applied to the biasing means and the pulse modulating means. The biasing means comprises a resistor 39 connected to continuously apply a positive input to bridge 43 through a diode 45.

The pulse modulating means comprises a multivibrator circuit having a resistor 35, a capacitor 34, an inductance 37, a Shockley diode 36, and a Zener diode 38; and a shunting circuit having a transistor 44 and a base resistor 46.

Figure 4:
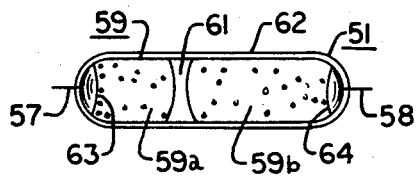
FIG. 4 is a side view of a coulombmeter of a type that may be utilized with the circuit shown in FIG. 1.

Recording means 50 comprises a measuring means for indicating electrical energy received and a reading means 53 for reading the total electrical energy received by the measuring means. The measuring means comprises a measuring or current integrating device, such as a mercury plating cell or coulombmeter 51, and a control means 56 for sensing the indication provided by coulombmeter 51 and for controlling the polarity of the control current connection. The control means comprises a means for reversing the direction of the control current applied to coulombmeter 51, such as a reversing switch 52, and a sensing means for sensing the indication produced by coulombmeter 51, as indicated by dashed line 65, and for controlling the reversing means, as indicated by dashed line 55. Coulombmeter 51 may be any suitable device that integrates current as a function of time, for example, a mercury plating cell coulombmeter 51 as shown in FIG. 4, a capacitor, or the coulombmeter shown in FIG. 6. Reading means 53 may be of any type known in the art that could comprise a counter or similar device for indicating the number of reversals of current applied to coulombmeter 51 to provide an appropriate output as indicated by line 54.

Referring to FIG. 4, coulombmeter 51 is a mercury plating cell of a type commercially available and comprises a sealed glass envelope 62, electrodes 63 and 64, typically of nonreactive metal such as platinum, connected to conductors 57 and 58, respectively. A mercury plating cell 59 is enclosed within envelope 62 and has a mercury section 59a and a mercury section 59b separated by an electrolyte section 61, using any suitable electrolyte such as a mercuric iodide salt solution. As current is applied to the cell the mercury is moved from one mercury section to the other as a function of current level and direction in a manner known in the art.

Referring to FIG. 1, with a coulombmeter as shown in FIG. 4, the sensing means senses the potential across coulombmeter 51 in any manner known in the art, as indicated by dashed line 65. When mercury has been substantially removed from one mercury section, the potential across coulombmeter 51 rises significantly, and the sensing means senses this increased potential in any manner known in the art and operates reversing switch 52 to reverse the polarity of the connections along conductors 22 and 23. In addition, reading means 53 responds to the increased potential or to the reversal function to indicate in some readout form known in the art along line 54, either by counting or other means, the fact that one selected unit of electrical energy has been consumed as indicated by the transfer of mercury in the mercury cell from one mercury section to the other.

Figure 6:
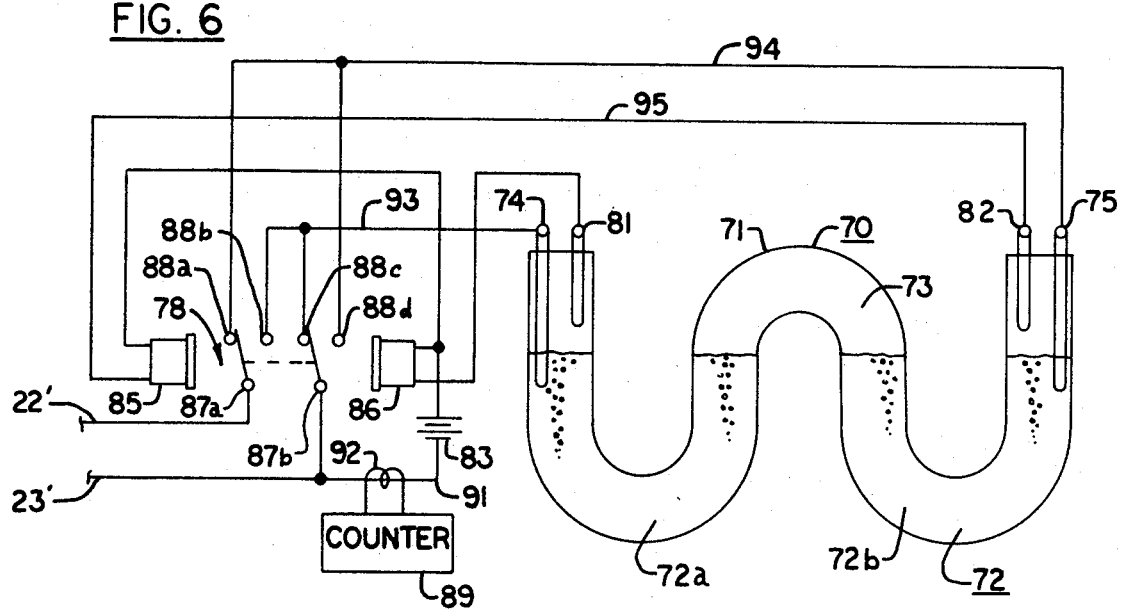
FIG. 6 is a drawing of a coulombmeter and a schematic of a reversing switch network and indicating device that could be utilized with the circuits shown in FIGS. 1 and 5.

Referring to FIG. 6, a type of measuring device and control means that may be used has a coulombmeter 70 with a double curve tube or envelope 71 as shown with a mercury cell 72 having a mercury section 72a and a mercury section 72b separated by a suitable electrolyte section 73. Current electrodes 74 and 75 carry control current from the rest of the meter system along conductors 22' and 23', corresponding to conductors 22 and 23 shown in FIG. 1, through a reversing switch 78. Sensing electrodes 81 and 82 are positioned within envelope 71 to sense the transfer of a selected amount of mercury between mercury cell sections 72a and 72b to thereby indicate a selected amount of electrical current received by or passed through coulombmeter 70.

Reversing switch 78 is connected between coulombmeter 70 and conductors 22' and 23'. A power source, such as a battery 83, a double-pole, double-throw, double-acting latch relay comprising a relay winding 85, a relay winding 86, switch input terminals 87a and 87b, and switch output terminals 88a, 88b, 88c and 88d. The reading means comprises a counter 89 of any type known in the art and a current transformer 92 connected to be responsive to current through a conductor 91 to indicate each time a reversal occurs.

In the operation of the circuit shown in FIG. 6, as the direct control current is applied along conductors 22' and 23', assuming the condition of mercury cell 72 to be as shown, and assuming a negative polarity at conductor 23', the current path is from conductor 23', through switch input terminal 87b and output terminal 88c, a conductor 93, electrode 74, mercury cell 72, thereby applying current in a direction to move mercury section 72b to 72a, electrode 75, a conductor 94, switch output terminal 88a and input terminal 87a to conductor 22'. The amount of mercury in section 72a is increased as a function of current applied and the level of the mercury in section 72a rises while the level in section 72b falls.

As the plating action continues, the amount of mercury in section 72a increases until the mercury reaches a level to make contact with sensing electrode 81. Upon contacting electrode 81, a circuit is closed between sensing electrode 81 and electrode 74 and a current path from battery 83 is completed through relay winding 86 to activate winding 86 and operate reversing switch 78 to take the other position from that shown in FIG. 6 to reverse the direction of control current to coulombmeter 70. The current path for the operation of relay winding 86 is from battery 83 through conductors 91 and 23', switch input terminal 87b and output terminal 88c, conductor 93, electrode 74, the mercury between electrodes 74 and 81, electrode 81, and relay winding 86 to battery 83. This energizes winding 86 and moves the switch contacts to connect input terminals 87a and 87b to output terminals 88b and 88d, respectively. The current through conductor 91 provides a current pulse in current transformer 92 that is sensed by counter 89 indicating that a reversal has taken place. Upon the reversal of switch 78, relay winding 86 is de-energized as the current path from battery 83 is broken by the disconnection of switch input terminal 88b from output terminal 88c.

Upon reversal of the switch, current polarity is reversed and mercury section 72b receives mercury until the circuit between sensing electrode 82 and electrode 75 is closed. The current path for plating mercury cell 72 is from conductor 22' through switch input terminal 87a and output terminal 88b, conductor 93, electrode 74, mercury cell 72, electrode 75, conductor 94, switch output terminal 88d and input terminal 87b to conductor 23'. When the mercury in mercury section 72b reaches electrode 82, a circuit is completed between sensing electrode 82 and current electrode 75 and winding 85 is energized to move the switch contacts back to the position shown in FIG. 6. The current path is from battery 83 through conductors 91 and 23', switch input terminal 87b and output terminal 88d, conductor 94, electrode 75, the mercury between electrodes 75 and 82, sensing electrode 82, a conductor 95, and relay winding 85 to battery 83. The current switching the relays is sensed by counting means 89 and relay winding 85 is de-energized as the circuit is broken by the switch contacts between switch input terminal 87a and output terminal 88b.

Figure 2:
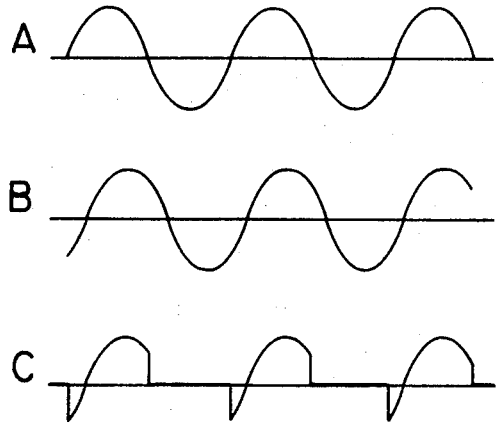
FIG. 2 is a graph of three wave forms that may occur during the operation of the system shown in FIG. 1.

In the operation of the circuit shown in FIG. 1, the control current is applied from current transformer 21 to recording means 50 as controlled by rectifying bridge 43. Referring to FIG. 2, FIG. 2B shows a typical control current wave form of current to reversing switch 52 without modification. Since the current is alternating, no charge would accumulate on coulombmeter 51 because the polarity is reversed every cycle. However, by controlling bridge 43 with the phase control voltage from secondary winding 41s of transformer 41, bridge 43 acts as a short circuit to the control current whenever bridge 43 is forward biased by the phase control voltage. When the voltage at a conductor 47 is positive relative to a conductor 38, bridge 43 is forward biased and no control current is passed to coulombmeter 51. The polarity relationship of the voltage of secondary winding 41s and current transformer 21 is selected to make conductor 47 positive with the control voltage from transformer 41 and conductor 22 negative with the control current from transformer 21 when the voltage and current are in phase.

Assuming a phase control voltage wave form as shown in FIG. 2A and a control current wave form as shown in FIG. 2B lagging the voltage about 30°, control current is applied to the coulombmeter only during the positive half cycle of the phase control voltage. With the control voltage out of phase with the control current, an automatic compensation for the phase angle, and thus actual energy consumed, is made since energy consumed is equal to the product of the voltage, current and the cosine of the phase angle. The net electrical current received by and passed through the coulombeter, as shown in FIG. 2C, is the current during the positive portion of the current wave form shown in FIG. 2C minus the negative portion. This sum varies as a function of the product of the voltage, current, and cosine of the phase angle and, thus, permits easy calibration of the meter system. When the phase control voltage and control current are in phase, rectifying bridge 43 conducts during the positive half cycle of the voltage and the total half cycle control current is applied to coulombmeter 51. As the control phase angle changes the commutation on rectifier bridge 43 changes and current flows for a portion of the current cycle in one direction and during the remainder in the other direction, thereby automatically compensating for a reading of the actual energy consumed.

Figure 3:
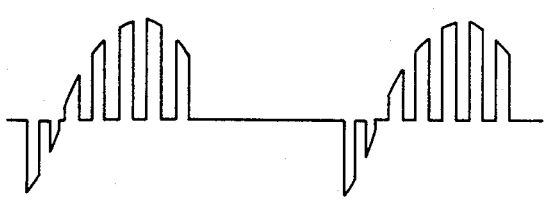
FIG. 3 is a graph of another wave form that may occur in the circuit of FIG. 1.

Voltage means 30 modulates the control current still further. Voltage means 30 receives a level control voltage from secondary winding 41s of transformer 41 and rectifies the voltage with rectifying bridge 31. This rectified voltage is then applied to multivibrator circuit 33 to pulse modulate the control current by further controlling the commutation of rectifier bridge 43. Referring to FIG. 3, a circuit of the type shown at a selected voltage level would modulate the control current as shown in FIG. 2C to a form shown in FIG. 3.

In operation of voltage means 30, the rectified voltage is applied through resistor 35, resistor 39, and diode 45 to conductor 47 to forward bias bridge 43 and thereby prevent the control current from being applied to coulombmeter 51. This rectified voltage is shunted away from bridge 43 whenever transistor 44 is turned on. With transistor 44 turned on, control current will be applied to coulombmeter 51 unless conductor 47 is made positive by the phase control voltage applied to conductor 47 through resistor 42 directly from transformer 41. Transistor 44 is controlled by the operation of the circuit multivibrator made up of resistor 46, capacitor 34, inductance 37, Shockley diode 36, and Zener diode 38. The multivibrator has the characteristic of producing a higher pulse rate as the input voltage increases because the charge is more quickly accumulated on capacitor 34 to break over Shockley diode 36. When the charge on capacitor 34 breaks over diode 36, a voltage appears across resistor 46 and base current turns on transistor 44 and connects the collector of transistor 44 to conductor 48 to enable conductor 47 to go negative across diode 45 if it is negative because of the voltage applied directly from winding 41s. The rate of turn-on of transistor 44 is determined by the rate at which capacitor 34 reaches the breakdown voltage of diode 36. Thus, transistor 44 is turned at a rate dependent upon the voltage level. Appropriate calibration and correlation of the voltage level is made to the system to adjust for different voltage levels. Zener diode 38 is connected to maintain a positive potential across capacitor 34 and prevent full discharge of capacitor 34. If capacitor 34 were allowed to fully discharge, current through resistor 39 could be interrupted upon the initiation of a charge cycle of capacitor 34.

Inductance 37 provides a frequency control component for insuring accurate modulation, and diode 45 prevents the shunting of the positive voltage occurring when conductor 47 is made positive by the positive half cycle appearing at secondary winding 41s of transformer 41.

Figure 5:
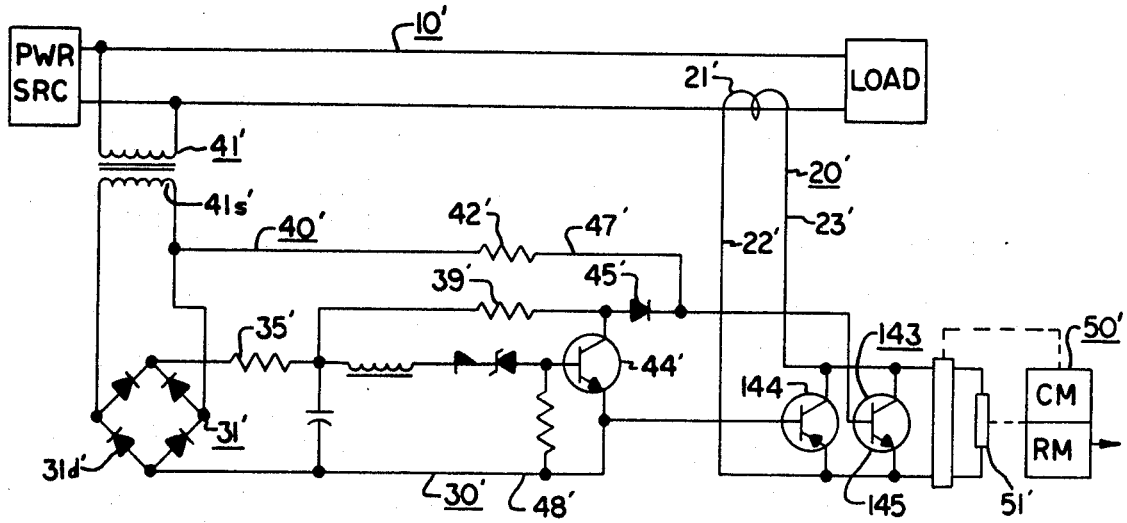
FIG. 5 is a schematic and block diagram of another watt-hour meter system according to this invention.

Referring to FIG. 5, a circuit similar to that of FIG. 1 is shown in which corresponding components are indicated by corresponding primed numerals. The circuit shown in FIG. 5 comprises an electrical power circuit 10', a current measuring means 20', a phase angle means 40', a voltage means 30' and a recording means 50'. The circuits of FIG. 1 and FIG. 5 are substantially the same except that a transistor commutating circuit 143 is substituted for rectifying bridge 43 shown in FIG. 1. Commutating circuit 143 comprises a transistor 144 and a transistor 145 connected across conductors 22' and 23' to shunt the control current from current transformer 21'.

In the operation of the circuit shown in FIG. 5 the commutator action is produced by the shorting of coulombmeter 51' by transistor 144 and transistor 145 whenever conductor 47' from transformer 41' is positive, in which case positive current flows from secondary winding 41s' through 42' and conductor 47' to the base of transistor 145, through the emitters of transistors 144 and 145 to the base of transistor 144, through conductor 48', and back through diode 31d' of rectifier bridge 31'. Thus, control current from current transformer 21' is not applied to coulombmeter 51' during one-half cycle of the voltage cycle appearing at secondary winding 41s' of voltage transformer 41'.

However, when conductor 47' is negative there is no base current to transistor 145, and transistor 145 and transistor 144 do not conduct from this source. However, a source of base current for transistor 145 is applied from rectifier bridge 31' through resistor 35', resistor 39' and diode 45' to the base of transistor 145. This prevents the application of control current to coulombeter except when transistor is turned on to shunt this current away from base of transistor 44' in the same manner as described with respect to FIG. 1.

I claim:

1. An electrical power measuring system for measuring the electrical energy consumed by an electrical load comprising:
 a current means responsive to the load current for producing a control current varying as a function of said load current;
 a recording means connected to receive the control current for measuring electrical current received;
 a current control means connected between the current means and the recording means and responsive to an electrical input for controlling application of said control current to said recording means to apply control current to said recording means only when said electrical input is below a preselected level;
 a voltage sensing means responsive to the load voltage for producing a control voltage varying as a function of the level of said load voltage;
 a biasing means for continuously applying an electrical input above said preselected level to the current control means; and
 a pulse modulating means responsive to the control voltage for pulse modulating the electrical input of said biasing means to a level below the preselected level at a pulse rate varying as a function of the level of said control voltage.

2. An electrical power measuring system according to claim 1 for measuring electrical energy consumed in an alternating electrical power system also comprising a phase angle means for applying an electrical input above the preselected level during a selected portion of each cycle of the control voltage to the current control means.

3. An alternating electrical power measuring system according to claim 2 wherein said pulse modulating means is responsive to the average control voltage level to shunt the electrical input from the biasing means and the electrical input from the phase angle means at a pulse rate substantially proportional to said average control voltage level.

4. An alternating electrical power measuring system according to claim 3 wherein said current control means comprises a commutating circuit connected between the current means and the recording means and responsive to an electrical input above the preselected level to shunt said control current away from said recording means.

5. An alternating electrical power measuring system according to claim 4 wherein said current means is responsive to the load current to produce a control current substantially proportional to said load current.

6. An alternating electrical power measuring system according to claim 5 wherein said recording means comprises a current measuring and integrating device.

7. An electrical power measuring system according to claim 1 wherein said pulse modulating means comprises a multivibrator and shunting circuit connected to intermittently shunt the control current at a pulse rate varying as a function of the level of said control voltage.

8. An electrical power measuring system according to claim 1 wherein said pulse modulating means is responsive to the control voltage level to shunt the electrical input to the current control means from the biasing means at a pulse rate substantially proportional to the level of said control voltage.

9. An electrical power measuring system according to claim 1 wherein said current control means comprises a commutating circuit connected between the current means and the recording means and responsive to the electrical input to shunt said control current away from said recording means when said electrical input is above the preselected level.

10. An electrical power measuring system according to claim 1 wherein said current means is responsive to the load current to produce a control current substantially proportional to said load current.

11. An electrical power measuring system according to claim 10 for measuring energy consumption in an alternating electrical load circuit also comprising a phase angle means for applying an electrical input above the preselected level during a selected half cycle of said control voltage to the current control means.

12. An alternating electrical power measuring system according to claim 11 wherein said voltage sensing means is responsive to the load voltage to produce a control voltage substantially proportional to said load voltage.

13. An alternating electrical power measuring system according to claim 12 wherein said pulse modulating means is responsive to the control voltage level to shunt the electrical input from the biasing means and from the phase angle means at a rate substantially proportional to said control voltage level.

14. An alternating electrical power measuring system according to claim 13 wherein said recording means comprises a current measuring and integrating device.

15. An alternating electrical power measuring system according to claim 14 wherein said pulse modulating means comprises a multivibrator and shunting circuit connected to pulse modulate the electrical input from the biasing means and from the phase angle means by intermittently shunting said electrical inputs at a rate varying substantially proportionally to the average level of said control voltage.

16. An electrical power measuring system according to claim 10 wherein said current control means comprises a controllable commutating device responsive to the electrical input and connected to shunt said control current, and wherein said pulse modulating means is connected to shunt said electrical input at a pulse rate substantially proportional to the average level of said control voltage.

17. An electrical power measuring system according to claim 16 for measuring energy consumption in an alternating electrical load circuit also comprising a phase angle means for applying an electrical input above the preselected level during a selected half cycle of the control voltage to the current control means.

18. An alternating electrical power measuring system according to claim 17 wherein said recording means comprises a current measuring and integrating device.

19. An alternating electrical power measuring system for measuring the electrical energy consumed by an electrical load comprising:
  a current transformer connected to be responsive to the load current to produce a control current as an output;
  a current measuring and integrating device connected to receive the control current;
  a commutating circuit connected between the current transformer and the measuring device and responsive to an electrical input of one polarity to shunt said control current;
  a biasing means for continuously applying an electrical input having said one polarity to the commutating circuit;
  a voltage transformer connected to be responsive to the load voltage to produce a control voltage as an output;
  a multivibrator shunting circuit having a pulse rate proportional to the level of an input and connected to shunt the electrical input to the commutating circuit; and
  a rectifying bridge connected to rectify the control voltage and apply the rectified control voltage as an input to the multivibrator shunting circuit.

20. An alternating electrical power measuring system according to claim 19 also comprising a phase angle means for applying the control voltage as an electrical input to the commutating circuit to thereby shunt the control current during the one polarity portion of said control voltage, and wherein said multivibrator shunting circuit also shunts said control voltage.

\* \* \* \* \*